May 10, 1960   L. YOUNG   2,936,418
PULSE AMPLITUDE MEASURING DEVICE
Filed Sept. 22, 1958

INVENTOR.
LEO YOUNG
BY
ATTORNEY
AGENT

2,936,418
PULSE AMPLITUDE MEASURING DEVICE

Leo Young, Baltimore, Md., assignor, by mesne assignments, to the United States of America as represented by the Secretary of the Air Force Application September 22, 1958, Serial No. 762,670

3 Claims. (Cl. 324—98)

The purpose of this invention is to provide apparatus for measuring the amplitude of periodically repeated voltage pulses of relatively short duration.

In accordance with the invention this is accomplished by applying the pulses to the vertical deflection circuit of a cathode ray tube and by using a periodic relatively low frequency electro-mechanical switch to alternate the base line of the pulse between a fixed direct potential, which may be ground potential, and an adjustable direct potential. Two traces of the pulse therefore appear on the screen of the cathode ray tube that are displaced vertically in accordance with the magnitude of the variable direct voltage. The magnitude of the variable voltage for which the top of one pulse trace is in exact alignment with the base line of the other trace is equal to the pulse magnitude. A feature of the invention is the exact symmetry of the switch and the base line voltage circuits connected to its contacts which assures that the two pulse traces appearing on the screen are exactly alike.

A more detailed description of the invention will be given with reference to the accompanying drawings in which.

Figure 1:
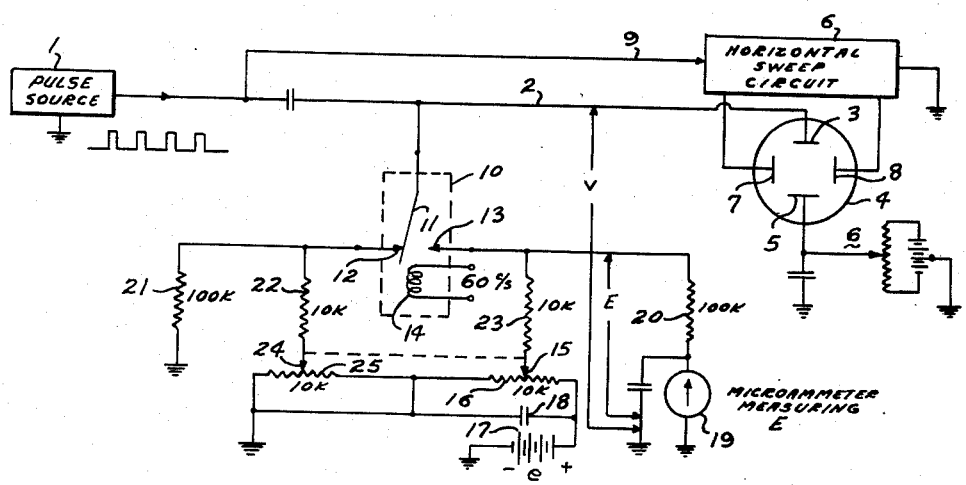
Fig. 1 is a schematic circuit of the pulse amplitude measuring apparatus.

Referring to Fig. 1 a series of identical pulses of constant repetition rate and unknown amplitude are applied from pulse source 1 over conductor 2 to one of the vertical deflection plates 3 of a cathode ray tube 4. The other vertical deflection plate 5 is connected to an adjustable source of direct potential 6 for vertically positioning the beam of the tube. Horizontal sweep circuit 6 generates horizontal deflection voltages which are applied to horizontal deflection plates 7 and 8. These voltages sweep the beam horizontally across the face of the tube in synchronism with the pulses applied to the vertical deflection plate 3 and preferably once for each applied pulse. This synchronism is effected by applying the pulses from source 1 over conductor 9 to horizontal sweep circuit 6 in a manner well known in the art.

Element 10 is a relatively low frequency periodic switch, often referred to as a chopper. The frequency of operation of this switch would normally be much lower than the repetition frequency of the pulses being measured. The switch has a moving contact 11 which is oscillated between stationary contacts 12 and 13 by 60 c./s. alternating current flowing in coil 14. Contact 12 is at ground direct potential whereas contact 13 has a direct potential relative to ground determined by the position of contact 15, the right hand terminal of resistance element 16 associated with this contact having a direct potential $e$ above ground due to direct current source 17. The right hand terminal of resistance 16 is by-passed to ground for the pulse signals by a condenser 18 of high capacitance. The potential E of contact 13 relative to ground is measured by a calibrated microammeter 19 connected between ground and this contact through 100K ohm resistor 20. Contact 12 is connected to ground through resistor 21 which equals resistor 20, resistor 22 which equals resistor 23 and potentiometer 24—25 which is identical to potentiometer 15—16 to which it is ganged for simultaneous operation.

Since, for the pulse signals, the ends of potentiometers 15—16 and 24—25 are at ground potential and since commercially available embodiments of switch 10 have a high degree of internal symmetry, the load presented to source 1 when contacts 11—12 are closed is identical to the load presented to source 1 when contacts 11—13 are closed and this identity is not disturbed by adjustment of the ganged potentiometers. Therefore the waveform of the pulse applied to the cathode ray tube vertical deflection plate is the same in either position of switch 10.

Figure 2A:
Figs. 2a, 2b, 2c and 2d illustrate waveforms appearing on the cathode ray tube screen for different values of the variable base line voltage.
Figure 2B:
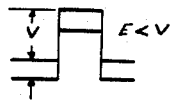
Figure 2C:
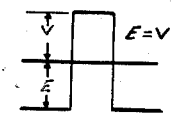
Figure 2D:
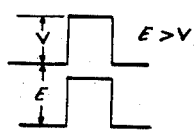

Figs. 2a–2d illustrate the traces produced on the screen of cathode ray tube 4 for various values of E. When $E=0$, the two traces due to pulses applied in the two positions of switch 10 are superimposed, as shown in Fig. 2a. When E is less than V, the pulse amplitude, the two traces are as shown in Fig. 2b and when greater than V the two traces are as shown in Fig. 2d. In measuring V, the value of E is adjusted at contact 15 until the top of one trace is in exact alignment with the base line of the other trace as shown in Fig. 2c. When this adjustment has been made the value of E read on meter 19 equals the pulse amplitude.

The advantage of the described system over that in which the pulse and a constant adjustable reference voltage are applied during alternate periods to the cathode ray tube indicator, using the same type of switch 10, is that the unavoidable coupling within the switch between the pulse circuit and the reference potential circuit results in a slight modulation of the reference voltage trace by the pulse in the region where it is aligned with the pulse trace. This modulation makes accurate alignment of the reference line with the pulse top difficult. In the described system the effect of this internal coupling is nullified by applying the pulse voltage to the cathode ray tube at all times and periodically switching base line circuits that are electrically identical to the pulse signal, in the above described manner. The resulting identical pulse traces can be accurately aligned.

I claim:

1. Apparatus for measuring the amplitude of a periodically repeated voltage pulse comprising: a cathode ray tube indicator; means for producing a horizontal sweep of the beam of said cathode ray tube; means for producing a vertical deflection of the beam of said cathode ray tube; means for applying said periodically repeated voltage pulse to said horizontal sweep means for synchronizing the horizontal sweep with the repetition frequency of said pulse; means for applying said repeated pulse to said vertical deflection means; a source of fixed reference voltage and a source of variable direct voltage having equal internal impedances; a periodic switching means having a frequency below the repetition frequency of said pulse for alternately connecting said voltage sources to said vertical deflection means; and means for indicating the magnitude of said variable voltage relative to said reference voltage.

2. Apparatus for measuring the amplitude of a periodically repeated voltage pulse comprising: a cathode ray tube indicator; means for producing a horizontal sweep of the beam of said cathode ray tube and means for synchronizing said horizontal sweep with the repetition frequency of said pulse; a pair of vertical deflection plates in said cathode ray tube; means connecting one of said plates to a point of reference potential; means applying said repeated pulse between the other plate and said point of reference potential; a switching means having first and second fixed contacts and a third contact that alternately and periodically contacts said first and second contacts at a frequency below the repetition frequency of said repeated pulse; a first electrical network connected between said first contact and said point of reference potential and containing means for introducing an adjustable direct voltage of the same polarity as said repeated pulse between said second contact and said point of reference potential, said first electrical network also having means for indicating the magnitude of said adjustable voltage and also introducing an impedance between said first contact and said point of reference potential; and a connection having the same impedance as said first network connected between said second contact and said point of reference potential.

3. Apparatus for measuring the amplitude of a periodically repeated voltage pulse comprising: a cathode ray tube indicator; means for producing a horizontal sweep of the beam of said cathode ray tube and means for synchronizing said horizontal sweep with the repetition frequency of said pulse; a pair of vertical deflection plates in said cathode ray tube; means connecting one of said plates to a point of reference potential; means applying said repeated pulse between the other plate and said point of reference potential; a switching means having first and second fixed contacts and a third contact that alternately and periodically contacts said first and second contacts at a frequency below the repetition frequency of said repeated pulse; first and second potentiometers having identical resistance elements and ganged adjustable tops; equal impedances connected between said first and second contacts and the tops of said first and second potentiometers, respectively; means for maintaining the terminals of the resistance element of said second potentiometer and one terminal of the resistance element of said first potentiometer at the potential of said point of reference potential; a condenser of low impedance to said repeated pulse connected between the remaining terminal of the resistance element of said first potentiometer and said point of reference potential; means for establishing a direct voltage across the resistance element of said first potentiometer; a high resistance voltage measuring device connected between said first contact and said point of reference potential; and a connection, having a resistance equal to that of siad voltage measuring device, between said second contact and said point of reference potential.

References Cited in the file of this patent

UNITED STATES PATENTS

| | | |
|---|---|---|
| 2,539,971 | Potjer | Jan. 30, 1951 |
| 2,548,276 | Weisbecker | Apr. 10, 1951 |
| 2,563,395 | Carpentier | Aug. 7, 1951 |